United States Patent [19]
Yamate et al.

[11] Patent Number: 5,673,878
[45] Date of Patent: Oct. 7, 1997

[54] GUIDE FOR A LINEAR BODY

[75] Inventors: Naoyuki Yamate; Hisashi Uneta, both of Saitama, Japan

[73] Assignee: Honda Giken Kogyo Kabushiki Kaisha, Tokyo, Japan

[21] Appl. No.: 462,880

[22] Filed: Jun. 5, 1995

[30] Foreign Application Priority Data

Aug. 5, 1994 [JP] Japan .................................. 6-184388

[51] Int. Cl.$^6$ .................................................... F16L 3/08
[52] U.S. Cl. .......................................... 248/65; 248/74.2
[58] Field of Search ........................ 248/65, 74.2, 230.1, 248/49; 74/502.4, 502.6

[56] References Cited

U.S. PATENT DOCUMENTS

| | | | |
|---|---|---|---|
| 3,995,512 | 12/1976 | Johnsen | 74/502.4 |
| 4,156,373 | 5/1979 | Juy | 74/502.6 |
| 4,245,713 | 1/1981 | Mochida et al. | 74/502.4 X |
| 4,266,744 | 5/1981 | Bergman | 248/49 |
| 4,325,269 | 4/1982 | Nagano | 74/502.6 |
| 4,582,281 | 4/1986 | Van Camp | 248/49 X |
| 4,671,537 | 6/1987 | Yoshitsugu | 248/74.2 X |
| 4,878,558 | 11/1989 | Asakura | |
| 5,226,456 | 7/1993 | Semak | 248/49 X |
| 5,236,212 | 8/1993 | Duehring et al. | 74/502.6 X |
| 5,333,821 | 8/1994 | Lee | 248/52 |
| 5,388,790 | 2/1995 | Guthke et al. | 248/65 X |

FOREIGN PATENT DOCUMENTS

| | | |
|---|---|---|
| 57-165586 | 10/1982 | Japan . |
| 62-38848 | 10/1987 | Japan . |
| 64-22593 | 2/1989 | Japan . |
| 3-36470 | 8/1991 | Japan . |
| 2237854 | 5/1991 | United Kingdom . |

*Primary Examiner*—Carl D. Friedman
*Assistant Examiner*—Aimee A. McTigue
*Attorney, Agent, or Firm*—Birch, Stewart, Kolasch & Birch, LLP

[57] ABSTRACT

The deflection of a flexible linear body disposed between first and second members is relatively changed in position for easy restriction. A guide is integrally formed of soft synthetic resin and is mounted between an inner tube and an outer tube of a front forked portion for holding an intermediate portion of a brake hose connected to a brake caliper for braking a front wheel of a motorcycle. The guide includes a pair of ring-like mounting portions fixed to the inner tube and the outer tube, a band-like bridging portion for connecting both the mounting portions to each other, a plurality of holding portions provided on the bridging portion for holding the brake hose. The bridging portion has a flat rectangular sectional shape and is mounted to be curved in the X-direction. The bridging portion is easy to be deflected in the X'-direction and is difficult to be deflected in the Y-Y directions so that the brake hose does not interfere with a boot and the front fender.

18 Claims, 6 Drawing Sheets

GUIDE FOR A LINEAR BODY

BACKGROUND OF THE INVENTION

1. Field of the Invention

The present invention relates to a guide for a linear body for holding an intermediate portion of a flexible linear body hung between a first member and a second member which are relatively changed in position for restricting the bending and the rocking of the linear body.

2. Description of the Background Art

Techniques for preventing the bending and rocking of a flexible linear body such as a brake hose or brake cable of a motorcycle are disclosed in Unexamined Japanese Utility Model Publication Nos. SHO 57-165586 and SHO 64-22593, and Examined Japanese Utility Model Publication Nos. HEI 3-36470 and SHO 62-38848, wherein the intermediate portion of the linear body is fixed by a clamp or held by insertion through an opening.

In the case where a linear body is hung between first and second members which are relatively changed in position, the above-described techniques have disadvantages wherein the mounting position of the clamp for preventing deflection of the linear body by the deviation of the first and second members is limited from interfering with the other member, or the rigidity of the linear body is limited.

OBJECTS AND SUMMARY OF THE INVENTION

In view of the foregoing, the present invention has been made, and an object of the present invention is to easily restrict the deflection of a flexible linear body hung between a first member and a second member which are relatively changed in position.

To achieve the above object, according to the invention, there is provided a guide for a linear body for holding an intermediate portion of a flexible linear body hung between a first member and a second member which are relatively changed in position, and restricting the bending and rocking of the linear body, including a pair of mounting portions connected to the first and second members, a flexible bridging portion for connecting the mounting portions to each other, a plurality of holding portions provided on the bridging portion for holding the linear body, wherein the bridging portion has such a shape that the bridging portion is easy to deform in a specified direction not interfering with the other member and is difficult to deform in other directions.

According to the invention, there is provided a guide body for a linear body wherein the bridging portion is curved in the specified direction in the state that a pair of the mounting portions are connected to the first and second members.

According to the invention, there is provided a guide for a linear body wherein the mounting portions and the bridging portion are formed of one member.

According to the invention, there is provided a guide for a linear body wherein the mounting portion and the bridging portion are constituted of removable different members.

According to the invention, there is provided a guide for a linear body wherein a holding portion having an approximately cylindrical shape with a slit is formed integrally with the bridging portion.

According to the invention, there is provided a guide for a linear body wherein the sectional shape of the bridging portion is an approximately rectangular shape which is narrow in width along the specified direction and is wide in width along the direction perpendicular thereto.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENTS OF THE INVENTION

Hereinafter, embodiments of the present invention will be described with reference to the drawings.

Figure 1:
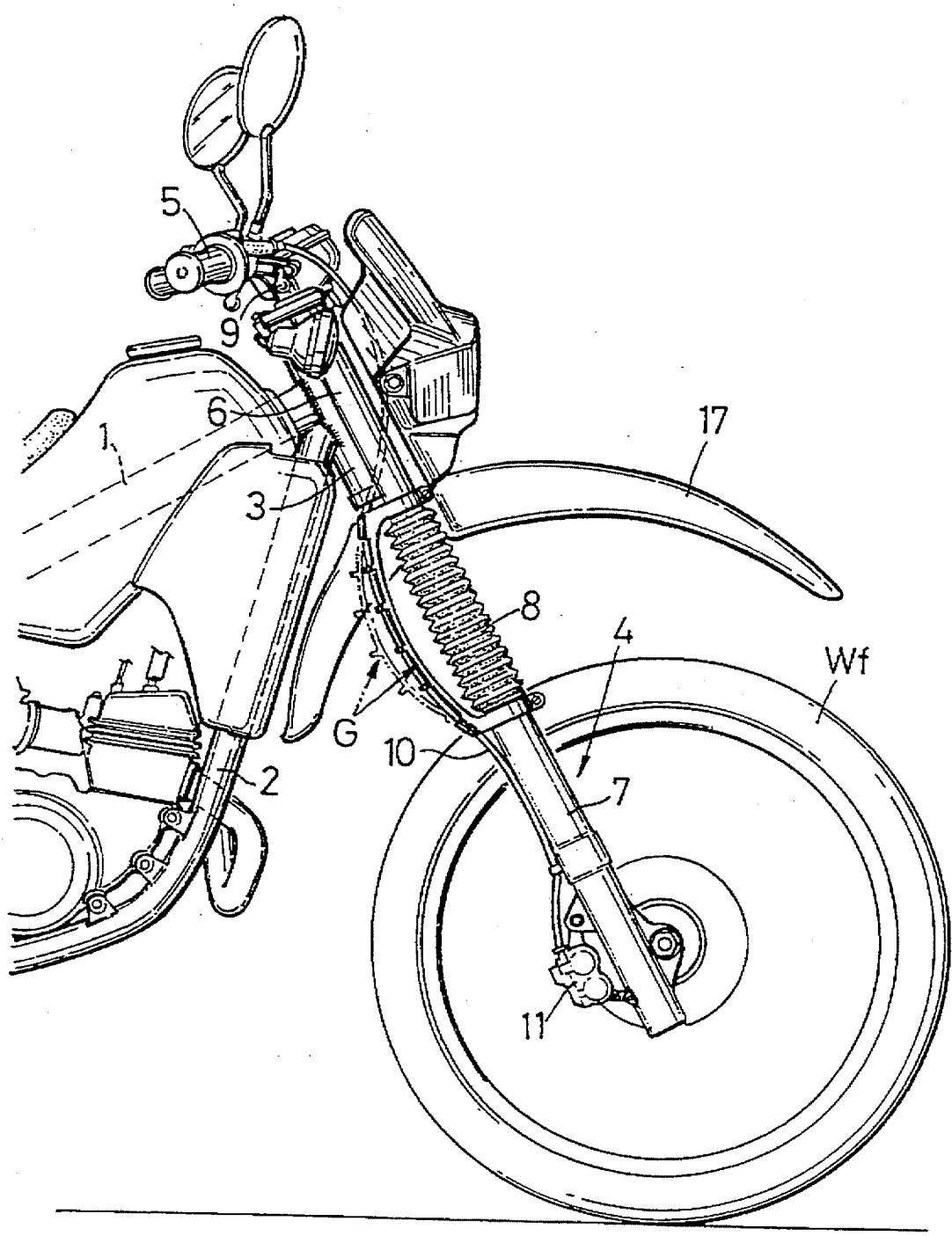
FIG. 1 is a side view of a front portion of a motorcycle according to a first embodiment.

As shown in FIG. 1, front fork portions 4 for rotatably supporting a front wheel Wf at their lower ends are pivotally supported by a head pipe 3 fixed to the front ends of a main pipe 1 and a down-tube 2 in such a manner as to be operable in the transverse direction. The front fork portion 4 includes an upper inner tube 6 connected to a handle 5, and a lower outer tube 7 telescopically fitted around the outer periphery of the lower portion of the upper inner tube 6. An expansible boot 8 is mounted between both the tubes 6 and 7. In this embodiment, the inner tube 6 constitutes a first member, and the outer tube 7 constitutes a second member.

A brake hose 10 extends from a master cylinder (not shown) operated by a brake lever 9 provided on the handle 5 downwardly extending along the front fork portion 4, and is connected to a brake caliper 11 provided on the lower end of the outer tube 7. A guide G is mounted between the lower portion of the inner tube 6 and the upper portion of the outer tube 7 in such a manner that the upper and lower end of the guide G holds the boot 8 therebetween. An intermediate portion of the brake hose 10 is held by the guide G. The brake hose 10 constitutes a linear body in the first embodiment.

Figure 2:
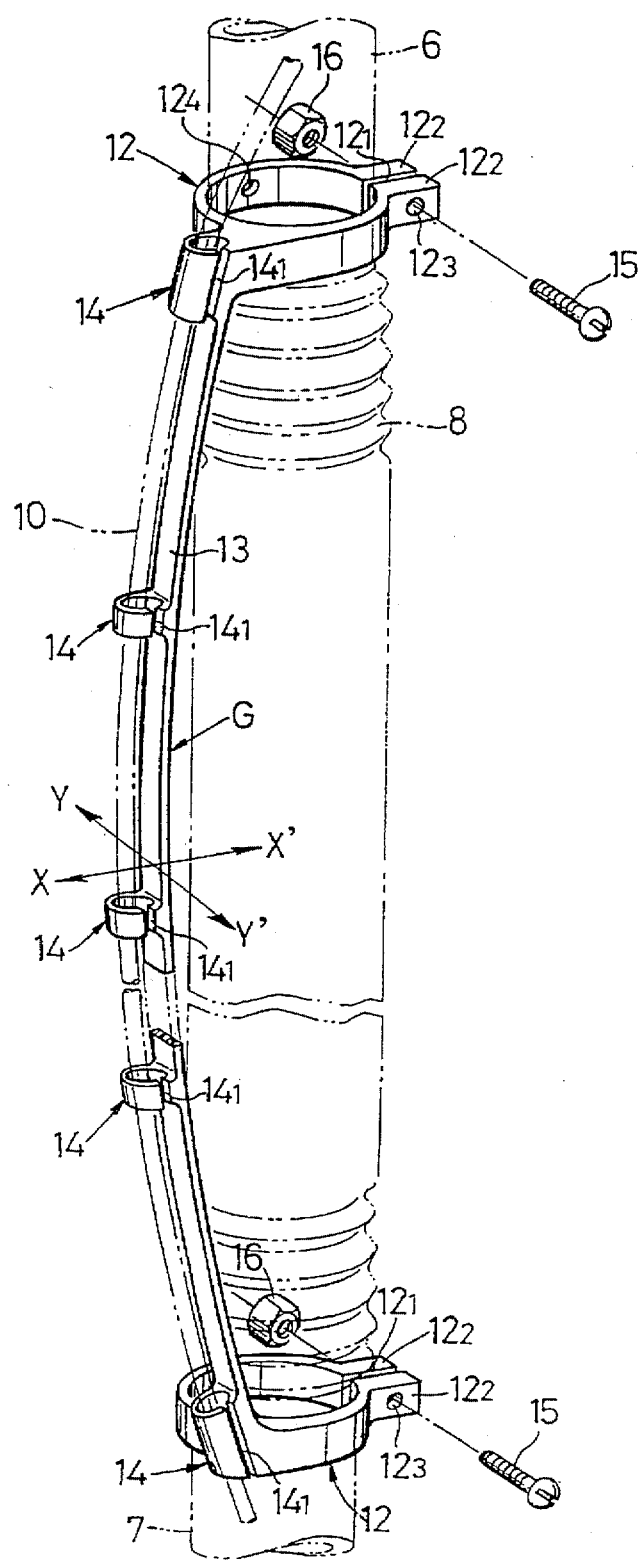
FIG. 2 is an enlarged perspective view of an essential portion of FIG. 1.

The structure of the guide G will be described in detail below with reference to FIG. 2.

The guide G is integrally formed of synthetic resin, which includes a pair of mounting portions 12, 12, a bridging portion 13 connecting the mounting portions 12, 12 to each other, and six pieces of holding portions 14 provided on the bridging portion 13.

Each of the mounting portions 12 is formed in a ring shape, and it has a pair of mounting brackets $12_2$, $12_2$ formed to hold a slit $12_1$ therebetween. The mounting portion 12 can be fixed on the inner tube 6 or outer tube 7 by elastically opening the slit $12_1$, fitting the mounting portion 12 around the outer periphery of the inner tube 6 or outer tube 7, passing a bolt 15 through bolt holes $12_3$, $12_3$ formed in the mounting brackets $12_2$, $12_2$, and fastening the bolt 15 by means of a nut 16. At this time, by engaging a positioning hole $12_4$ formed on the mounting portion 12 with a pin (not shown) planted on the inner tube 6 or outer tube 7, the mounting portion 12 is pin-fitted.

The bridging portion 13 is formed in a band shape having a flat rectangular section, and is connected at both the ends to a pair of the mounting portions 12, 12. In a free state (no lead state), the bridging portion 13 is curved in an arcuate shape; while in a mounting state, it is curved toward the rear side of a vehicle (X-direction). The bridging portion 13 is mounted while keeping a specified looseness so that even when the front fork portion 4 is fully extended (full rebounding state), the bridging portion 13 does not fully extend and keeps the curved state.

The bridging portion 13 has a small width in the curving directions (X-X' directions) and is easy to be deflected in the X-X' directions; while it has a large width in the directions (Y-Y' directions) perpendicular to the curving directions and is difficult to be deflected in the Y-Y' directions. However, since the bridging portion 13 is mounted in the state that it is previously curved in the X-direction, when the front fork portion 4 extends and the distance between a pair of the mounting portions 12, 12 is changed, the bridging portion 13 is substantially deflected only in the X-direction and is slightly deflected in the X'-direction and in the Y-Y' directions.

Each of the holding portions 14, provided integrally with the bridging portion 13 at specified intervals, is formed in a cylindrical shape, and the holding portions 14 have a slit $14_4$ extending in the axial direction. By elastically opening the slit $14_1$, the brake hose 10 can be simply held by the holding portion 14.

The bridging portion 13 is positioned at the back of the boot 8, and the brake hose 10 is positioned at the back of the bridging portion 13. Accordingly, a stone flying from the front side is blocked by the boot 8 and the bridging portion 13.

When the front fork portion 4 is extended/contracted during the operation of a motorcycle, the distance between the mounting portion 12 fixed on the inner tube 6 and the mounting portion 12 fixed on the outer tube 7 is increased/decreased, and thereby the bridging portion 13 is curved between the state shown by the solid line and the state shown by the chain line in FIG. 1. At this time, the curving direction of the bridging portion 13 is restricted on the rear side of the vehicle (X-direction) and the brake hose 10 is held along the bridging portion 13. This eliminates inconveniences that the bridging portion 13 is rocked on the front side of the vehicle, causing the brake hose 10 to interfere with the boot 8, or the bridging portion 13 is rocked in the width direction of the vehicle, causing the brake hose 10 to interfere with the front fender 17.

Since the brake hose 10 held along the bridging portion 13 is curved not sharply but smoothly, the brake hose 10 is not applied with a large bending stress. Further, the intermediate portion of the brake hose 10 is not caught by another member such as the front fender 17 and is thus not applied with a large tensile strength. Accordingly, it becomes possible to prevent damage to the brake hose 10.

Since the bridging portion 13 for holding the intermediate portion of the brake hose 10 is not directly connected to the inner tube 6 and the outer tube 7 but is indirectly connected at both the ends to the inner tube 6 and the outer tube 7 by way of the mounting portions 12, 12, the brake hose 10 can be easily held at a position where the brake hose 10 was difficult to be held because the clamp could not be held.

Figure 3:
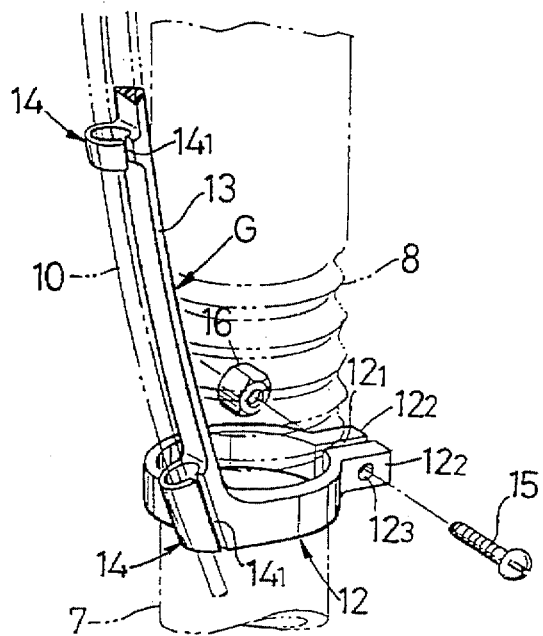
FIG. 3 is a view showing a modification of the first embodiment.

FIG. 3 shows a modification of the first embodiment, wherein the sectional shape of the bridging portion 13 is formed approximately in an isosceles triangle having a height lower in the longitudinal direction of the vehicle, thereby facilitating the deflection of the bridging portion 13 on the rear side of the vehicle.

Figure 4:
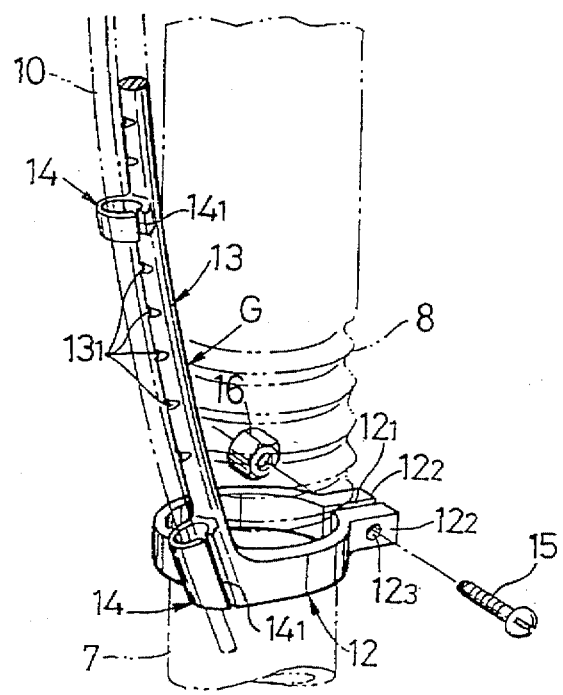
FIG. 4 is a view showing another modification of the first embodiment.

FIG. 4 shows another modification of the first embodiment, wherein cut-outs $13_1$ are formed in the surface of a bridging portion 13 of a circular section on the rear side of the vehicle at specified intervals, thereby making easy the deflection of the bridging portion 13 on the rear side of the vehicle.

Figure 5:
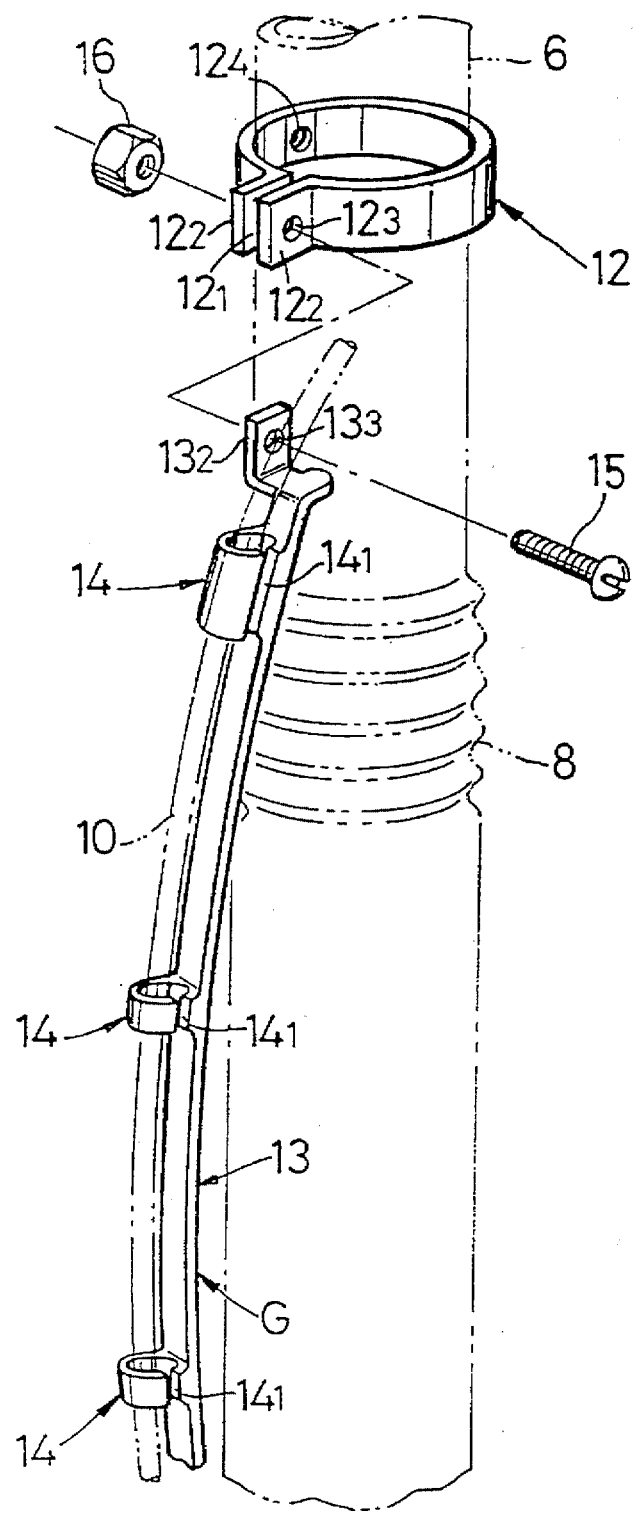
FIG. 5 is a view showing a further modification of the first embodiment.

FIG. 5 shows a further modification of the first embodiment, wherein the mounting portions 12, 12 of the guide G are made of a material different from that of the bridging portion 13. Bolts 15, 15 for fastening the mounting brackets $12_2$, $12_2$ of the mounting portions 12, 12 are allowed to pass through bolt holes $13_3$, $13_3$ of the mounting brackets $13_2$, $13_2$ provided at both the ends of the bridging portion 13. With this arrangement, when the mounting portions 12, 12 are fixed on the inner tube 6 or the outer tube 7, the bridging portion 13 can be fastened together with the mounting portions 12, 12.

In this modification, the number of parts of the guide G is increased as compared with the first embodiment. However, by molding the mounting portions 12, 12 separately from the bridging portion 13, the molding die can be reduced in size. Moreover, the versatility of the guide G can be enhanced by preparing a plurality of different mounting portions 12, 12 and bridging portion 13 which are different in size and shape, and using them in a suitable combination.

A second embodiment of the present invention will be described with reference to FIGS. 6 and 7.

Figure 6:
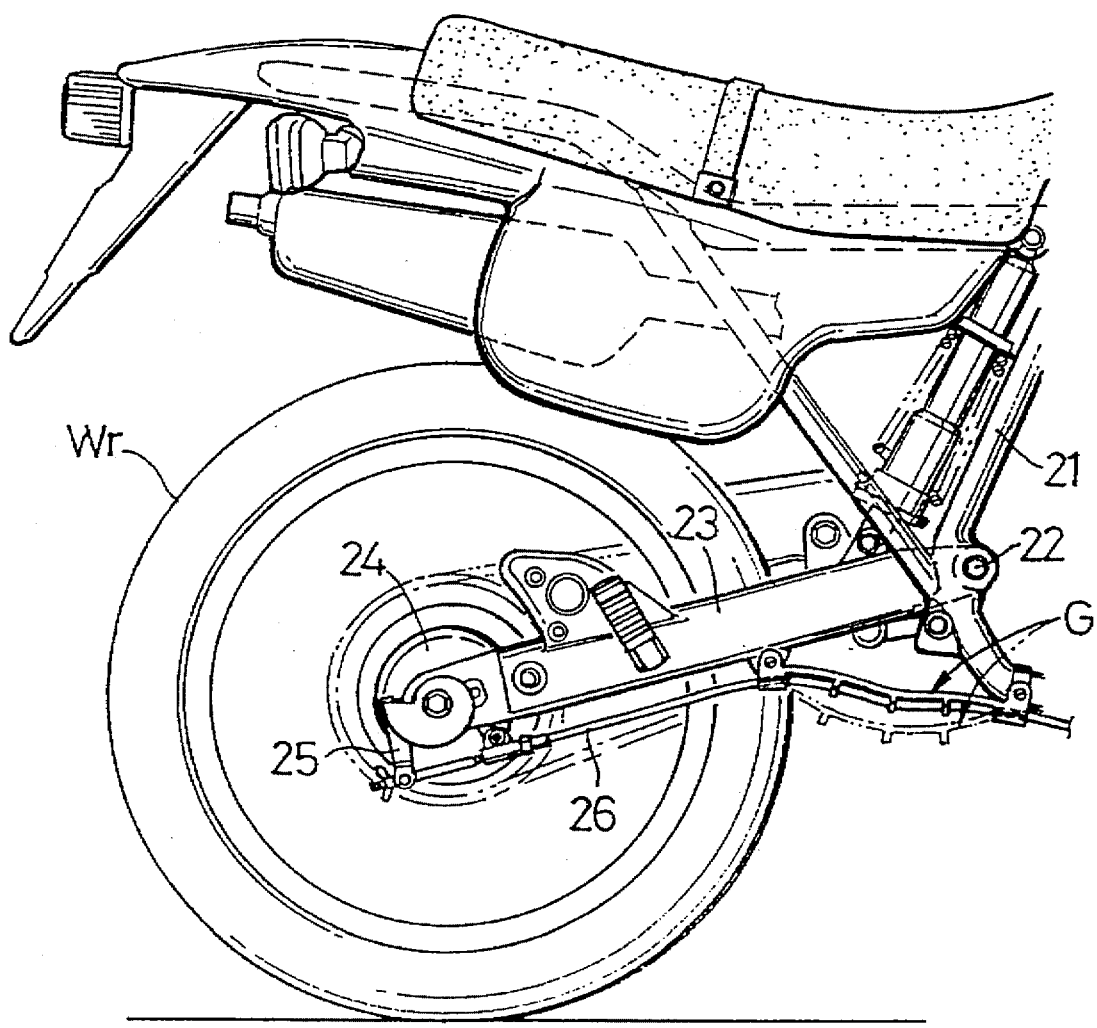
FIG. 6 is a side view of a rear portion of a motorcycle according to a second embodiment.

As shown in FIG. 6, a rear forked portion 23 (second member) is pivotally supported on the rear end of each rear tube 21 (first member) of a motorcycle by way of a pivot 22 in such a manner as to be vertically rockable. A brake arm 25 of a drum brake 24 for braking a rear wheel Wr rotatably supported at the rear end of the rear forked portion 23, and a brake pedal (not shown) are connected to each other by way of a brake cable (linear body) extending along the lower side of the rear tube 21 and the rear forked portion 23. The brake cable 26 hung between the rear tube 21 and the rear 12 forked portion 23 is held by a guide G.

Figure 7:
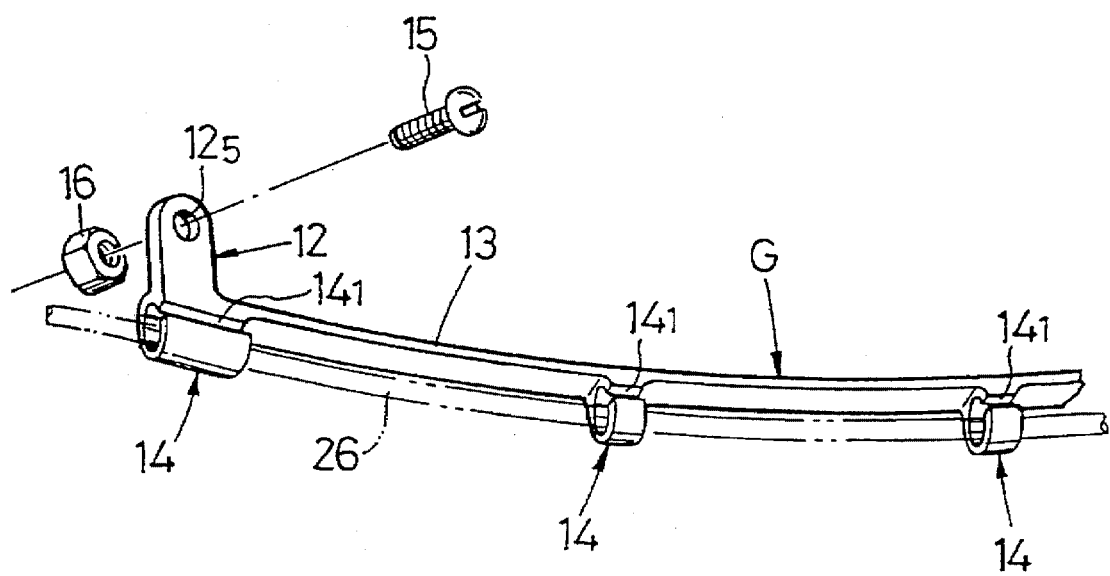
FIG. 7 is an enlarged perspective view of an essential portion of FIG. 6.

As shown in FIG. 7, the guide G is integrally formed of a soft synthetic resin, and it includes a pair of mounting portions 12, 12, a bridging portion 13 for connecting both the mounting portions 12, 12 to each other, and five pieces of holding portions 14 provided on the bridging portion 13,.. The structures of the bridging portion 13 and the holding portion 14 are substantially the same as those in the first embodiment. The structure of the mounting portion 12 is different from that in the first embodiment. Namely, the mounting portion 12 is formed in a plate-like shape, and it is fixed to the rear tube 21 or rear forked portion 23 by means of a bolt 15 passing through a bolt hole $12_6$ formed on the mounting portion 12 and a nut 16 screwed with the bolt 15.

According to the second embodiment, when the rear forked portion 23 is vertically rocked relative to the rear tube 21 during operation of a motorcycle, the guide G is curved only downwardly (from the position shown by the solid line to the position shown by the chain line in FIG. 6) together with the brake cable 26. This eliminates inconveniences that the bridging portion 13 is rocked upwardly and the brake cable 26 interferes with the rear tube 21 or the rear forked portion 23, or the bridging portion 13 is rocked in the width direction of the vehicle, and the brake cable 26 interferes with the other member or is caught by the other member thereby causing a large tensile strength. Moreover, since the brake cable 26 held along the bridging portion 13 is not sharply bent, it is not applied with a large bending stress.

Even when a small stone thrown by the rear wheel Wr is dropped in front of the rear wheel Wr, the brake cable 26 covered on the upper surface with the bridging portion 13 of the guide G is prevented from being damaged.

Although the present invention has been described with reference to the embodiments, various changes in design are possible without departing from the scope of the present invention.

For example, the first and .second members of the present invention are not particularly limited as long as they are relatively changed in position. The linear body is not limited to the brake hose 10 and the brake cable 26 in the embodiments, and it may include an arbitrary linear body such as a hose, pipe, tube, cable, wire and electric wire.

In particular, even a linear body, which cannot be positively held by a conventional clamp because of being low in rigidity and being easier to be deflected, can be positively held by the bridging portion 13. The bridging portion 13 may be molded to be in the straight line in a free state (no load state) and may be curved after mounting.

As described above, there is provided a guide for a linear body for holding an intermediate portion of a flexible linear body hung between a first member and a second member which are relatively changed in position, and restricting the bending and rocking of the linear body, including a pair of mounting portions connected to the first and second members, a flexible bridging portion for connecting the mounting portions to each other, a plurality of holding portions provided on the bridging portion for holding the linear body, wherein the bridging portion has such a shape that the bridging portion is easy to be deformed in a specified direction not interfering with the other member and is difficult to be deformed in other directions.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A guide for holding an intermediate portion of a flexible linear conduit body disposed between a first tube member and a second member forming part of a forked portion, the first tube member and the second member forming a wheel fork assembly and positioned for movement relative to each other, and for restricting the bending and rocking of said linear conduit body comprising:
   a pair of mounting portions adapted to connect to said first tube member and said second member of said wheel fork assembly;
   a flexible bridging portion for connecting said mounting portions to each other;
   a plurality of holding portions provided on said bridging portion for holding said linear conduit body;
   wherein said bridging portion is readily deformable along said length in a first predetermined direction and is not readily deformable in a second predetermined direction.

2. The guide body for a linear body according to claim 1, wherein said bridging portion is adapted to be curved in said first specified direction when a pair of said mounting portions are connected to said first tube member and the second member of said wheel fork assembly.

3. The guide for a linear body according to claim 1, wherein said mounting portions and said bridging portion are formed as one member.

4. The guide for a linear body according to claim 1, wherein said mounting portion and said bridging portion are separate removable members.

5. The guide for a linear body according to claim 1, wherein each holding portion is an approximately cylindrically shaped member with a slit formed therein, said holding portions being integral with said bridging portion.

6. The guide for a linear body according to claim 1, wherein a sectional shape of said bridging portion is an approximately rectangular shape which is long in a first predetermined direction and is wide in width in a direction perpendicular thereto.

7. A guide for holding an intermediate portion of a flexible linear conduit body disposed between a first tube member and a second member forming part of forked portion, the first tube member and the second member forming a wheel fork assembly positioned for movement relative to each other, and for restricting the bending and rocking of said linear conduit body comprising:
   a first mounting member adapted for connection to said first tube member of said wheel fork assembly;
   a second mounting member adapted for connection to said second member of said wheel fork assembly;
   a flexible bridging portion having a predetermined length for connecting said first mounting member to said second mounting member;
   a plurality of holding portions provided along the length of said flexible bridging portion for retaining said linear conduit body relative thereto;
   wherein said bridging portion is readily deformable along said length in a first predetermined direction and is not readily deformable in a second predetermined direction.

8. The guide body for a linear body according to claim 1, wherein said bridging portion is adapted to be curved in said first predetermined direction when the first and second mounting members are connected to said first tube member and the second member of said wheel fork assembly.

9. The guide for a linear body according to claim 7, wherein said first and second mounting members and said bridging portion are formed as one member.

10. The guide for a linear body according to claim 7, wherein said first and second mounting members and said bridging portion are separate removable members.

11. The guide for a linear body according to claim 1, wherein each holding portion is an approximately cylindrically shaped member with a slit formed therein, said holding portions being integral with said bridging portion.

12. The guide for a linear body according to claim 7, wherein a sectional shape of said bridging portion is an approximately rectangular shape which is long in a first predetermined direction and is wide in width in a second predetermined direction perpendicular thereto.

13. A guide for holding an intermediate portion of a flexible linear conduit body disposed between a first tube member and a second member forming part of a forked portion, the first tube member and the second member forming a wheel fork assembly and positioned for movement relative to each other, and for restricting the bending and rocking of said linear conduit body comprising:

- a first mounting member adapted for mounting on said first tube member of said wheel fork assembly;
- a second mounting member adapted for mounting on said second member of said wheel fork assembly;
- a flexible bridging portion having a predetermined length and a predetermined width, said flexible bridging portion being disposed for connecting said first mounting member to said second mounting member;
- a plurality of holding portions provided along the length of said flexible bridging portion for retaining said linear conduit body relative thereto;
- wherein said bridging portion is readily deformable along said length in a first predetermined direction and is not readily deformable along said width in a second predetermined direction.

14. The guide body for a linear body according to claim 13, wherein said bridging portion is adapted to be curved in said first predetermined direction when said first and second mounting members are connected to said first tube member and the second member of said wheel fork assembly.

15. The guide for a linear body according to claim 13, wherein said first and second mounting members and said bridging portion are formed as one member.

16. The guide for a linear body according to claim 13, wherein said first and second mounting members and said bridging portion are separate removable members.

17. The guide for a linear body according to claim 13, wherein each holding portion is an approximately cylindrically shaped member with a slit formed therein, said holding portions being integral with said bridging portion.

18. The guide for a linear body according to claim 13, wherein a sectional shape of said bridging portion is an approximately rectangular shape which is long in a first predetermined direction and is wide in width in a second predetermined direction perpendicular thereto.

* * * * *